United States Patent
Casati et al.

(10) Patent No.: US 7,240,324 B2
(45) Date of Patent: Jul. 3, 2007

(54) EVENT-BASED SCHEDULING METHOD AND SYSTEM FOR WORKFLOW ACTIVITIES

(75) Inventors: Fabio Casati, Palo Alto, CA (US); Ming-Chien Shan, Saratoga, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1215 days.

(21) Appl. No.: 09/797,536

(22) Filed: Feb. 28, 2001

(65) Prior Publication Data
US 2002/0170035 A1     Nov. 14, 2002

(51) Int. Cl.
*G06F 9/44* (2006.01)

(52) U.S. Cl. ............... 717/103; 717/104; 717/105; 717/106; 717/127; 709/248

(58) Field of Classification Search ............... 717/100, 717/101–109, 124–129, 136, 151; 705/8, 705/9; 707/201, 102, 200; 709/203, 248–250; 714/15
See application file for complete search history.

(56) References Cited

U.S. PATENT DOCUMENTS

| | | | | |
|---|---|---|---|---|
| 5,301,320 A | * | 4/1994 | McAtee et al. | 705/9 |
| 5,581,691 A | * | 12/1996 | Hsu et al. | 714/15 |
| 5,745,687 A | * | 4/1998 | Randell | 709/201 |
| 5,754,857 A | * | 5/1998 | Gadol | 709/203 |
| 5,826,020 A | * | 10/1998 | Randell | 709/202 |
| 5,826,239 A | * | 10/1998 | Du et al. | 705/8 |
| 6,253,369 B1 | * | 6/2001 | Cloud et al. | 717/136 |
| 6,311,192 B1 | * | 10/2001 | Rosenthal et al. | 707/200 |
| 6,353,833 B1 | * | 3/2002 | Bird et al. | 707/201 |
| 6,397,192 B1 | * | 5/2002 | Notani et al. | 705/9 |
| 6,728,947 B1 | * | 4/2004 | Bengston | 717/103 |

(Continued)

FOREIGN PATENT DOCUMENTS

JP     11-110359     *    4/1999

OTHER PUBLICATIONS

Hans Schuster, Jens Neeb, Ralf Schamburger, A configuration management approach for large workflow management systems, 1999, ACM, p. 177-186.*

(Continued)

*Primary Examiner*—Wei Zhen
*Assistant Examiner*—Satish S. Rampuria

(57) ABSTRACT

An event-based scheduling method and system for providing automatic activity synchronization and automatic data exchange between workflows and between workflows and other applications. An automatic synchronization mechanism is provided for enabling workflows to interact with other workflows or other applications to automatically synchronize activity execution. An automatic data exchange mechanism is provided for enabling workflows to exchange data with other workflows or other applications. An event processing pre-compilation architecture receives a workflow definition having at least one event node and responsive thereto generates a workflow definition without event nodes at compile time. Each event node is replaced with a translated workflow node that conforms to the syntax supported by the underlying workflow engine. The translated workflow node is also assigned to an application that can implement the desired event node semantics. An event processing run-time architecture invokes the application assigned to the translated node when the translated node is encountered. The application employs a publication and subscription tool for automatically performing activity synchronization and/or data exchange at run time.

16 Claims, 9 Drawing Sheets

U.S. PATENT DOCUMENTS

2002/0055928 A1* 5/2002 Worthington ............... 707/102
2003/0004771 A1* 1/2003 Yaung .......................... 705/8
2003/0195785 A1* 10/2003 Thalangara et al. ........... 705/8

OTHER PUBLICATIONS

Hans Schuster, Jens Neeb, Ralf Schaumburger, A configuration management approach for large workflow management systems, 1999,, ACM, p. 177-186.*

McClatchey et al., Version management in a distributed workflow application, IEEE, Sep. 1-2, 1997 pp. 10-15.*

Weske, Flexible modeling and execution of workflow activities, IEEE, vol. 7, Jan. 6-9, 1998 pp. 713-722.*

Hongmei et al., An agent-based approach for workflow management, IEEE, vol. 1, Oct. 8-11, 2000 pp. 292-297.*

Alonso et al., Process synchronization in workflow management systems, IEEE, Oct. 1996, pp. 581-588.*

Godart et al., Cooperative workflows to coordinate asynchronous cooperative applications in a simple way, IEEE, Jul. 2000 pp. 409-416.*

Barros et al., Modelling extensions for concurrent workflow coordination, IEEE, Sep. 1999 pp. 336-347.*

* cited by examiner

EVENT-BASED SCHEDULING METHOD AND SYSTEM FOR WORKFLOW ACTIVITIES

FIELD OF THE INVENTION

The present invention relates generally to workflow technology, and more particularly, to event-based scheduling method and system for workflow activities.

BACKGROUND OF THE INVENTION

Workflow management is a rapidly evolving technology that many businesses in a variety of industries utilize to handle business processes. A business process, as defined by the Workflow standard—Terminology & glossary, Technical Report WFMC-TC-1011, Worflow Management Coalition, June 1996. Versions 2.0., is simply a set of one or more linked activities that collectively realize a business objective or a policy goal, typically within the context of an organizational structure defining functional roles and relationships. A workflow is defined as the automation of a business process, in whole or in part, during which documents, information, or activities are passed from one participant to another, according to a set of predefined rules. A workflow management system (WfMS) defines, creates, and manages the execution of workflows.

Examples of workflow software include BusinessWare software, available from Vitria Technology, Inc. of Sunnyvale, Calif., Inconcert software, available from TIBCO Software, Inc. of Palo Alto, Calif., MQ Series software, available from International Business Machines Corporation (IBM), of Armonk, N.Y., and Staffware 2000, available from Staffware of Berkshire, United Kingdom.

In most workflow management systems (WfMS), the progression of a workflow is synchronous (i.e., as soon as an activity is completed, other activities can be started by the WfMS according to the execution dependencies specified in the workflow definition). However, there is frequently the need of specifying activities that, in order to be started, need to wait for an event to occur. For instance, an activity "Pay Employees" should start on the scheduled payday. As another example, the activity "Repair Car" should start when the event "Car Accident" is detected. Hence, these activities are not only activated due to the completion of a previous activity, but also due to the occurrence of a certain event. In this regard, it is desirable for there to be a mechanism that facilitates the activation of workflow activities based on the occurrence of certain events.

Some products acknowledge the utility of having event-based workflow execution. For example, Staffware 2000 allows for a workflow to suspend execution until the occurrence of an event. Unfortunately, this event must be manually programmed by a workflow designer. As can be appreciated, it is both time-consuming and inconvenient to require a workflow designer to write software code that generates an event corresponding to a specific instance of a business process that may or may not even be in the same enterprise as the current workflow.

Another shortcoming of the Staffware 2000 product is that it does not appear to support nodes that can send events. Consequently, Staffware 2000 product does not have a uniform and homogeneous mechanism for synchronizing with other workflows. In other words, coordination between two workflows cannot be automatic since one communication leg is missing and not supported.

Another disadvantage of the Staffware 2000 approach is that since send nodes are not supported, it cannot send events that carry values taken from the state of a workflow. Consequently, the Staffware 2000 approach does not provide a uniform and homogeneous mechanism for exchanging information with other workflow. In other words, data exchange between two workflows cannot be automatic since one communication leg is missing and not supported.

Moreover, Staffware requires the application that notifies an event to determine exactly which process instance is to be the recipient of the event. As can be appreciated this task is difficult and time consuming because new instances are created and destroyed continuously.

Consequently, it is desirable for there to be a facility to automatically sychronize activities and exchange data between workflows.

Furthermore, most workflow management systems (WfMSs) only support the separate and independent execution of business processes. However, business processes in reality need to interact with each other. For example, two business processes may need to synchronize the execution of their activities, to exchange process data, or to notify the progress in the process execution. Recent market trends increase the need for cooperation and interaction not only between different processes within a single organization, but also between different processes executed in different organizations.

In this regard, it is desirable for there to be a mechanism that facilitates inter-enterprise communication between workflows and between a workflow and other applications. As can be appreciated, the need to have workflows interact and cooperate across different organizations pose numerous challenges to prior art workflow systems.

Based on the foregoing, there remains a need for a method and system for a mechanism to provide event-based scheduling for workflow activities that overcomes the disadvantages set forth previously.

SUMMARY OF THE INVENTION

According to one embodiment of the present invention, an event-based scheduling method and system for workflow activities is described.

One aspect of the present invention is the provision of a uniform and homogeneous mechanism for automatically synchronizing or coordinating between workflows or between a workflow and other applications.

Another aspect of the present invention is the provision of a uniform and homogeneous mechanism for automatically exchanging information between workflows or between a workflow and other applications.

Another aspect of the present invention is the provision of a mechanism that facilitates inter-enterprise communication between workflows and between a workflow and other applications.

According to one embodiment, an event-based scheduling method and system for providing automatic activity synchronization and automatic data exchange between workflows and between workflows and other applications is provided. An automatic synchronization mechanism is provided for enabling workflows to interact with other workflows or other applications to automatically synchronize activity execution. An automatic data exchange mechanism is provided for enabling workflows to exchange data with other workflows or other applications. An event processing pre-compilation architecture receives a workflow definition having at least one event node and responsive thereto generates a workflow definition without event nodes at compile time. Each event node is replaced with a translated workflow node that conforms to the syntax supported by the underlying workflow engine. The translated workflow node is also assigned to an application that can implement the desired event node semantics. An event processing run-time architecture invokes the application assigned to the translated node when the translated node is encountered. The application employs a publication and subscription tool for automatically performing activity synchronization and/or data exchange at run time.

According to another embodiment, a scheduling method and system that enables cooperation between at least a first workflow and a second workflow that are executing in the same organization or in different organizations is provided. The scheduling method and system of the present invention allows a workflow management system (WfMS) to schedule activities based on the occurrence of events, by enabling the definition of points in the workflow where the execution should pause to wait for an event to be notified. The scheduling method and system of the present invention also provides a mechanism (e.g., send applications and receive applications) for allowing workflows to publish and subscribe to events and for making the activation of a task dependent on events that are received. The management of event notifications can involve filtering events, correlating events, and dispatching event to an appropriate target workflow instances.

One advantage of the present invention is that the synchronization method and system can be mapped to or easily implemented onto any workflow model by specifying event specific constructs by using ordinary workflow activities. Another related advantage of the present invention is that the event handling mechanism of the present invention is easily portable to different platforms and does not require integration with a specific workflow management system (WfMS) that supports cooperating workflows.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

Figure 1:
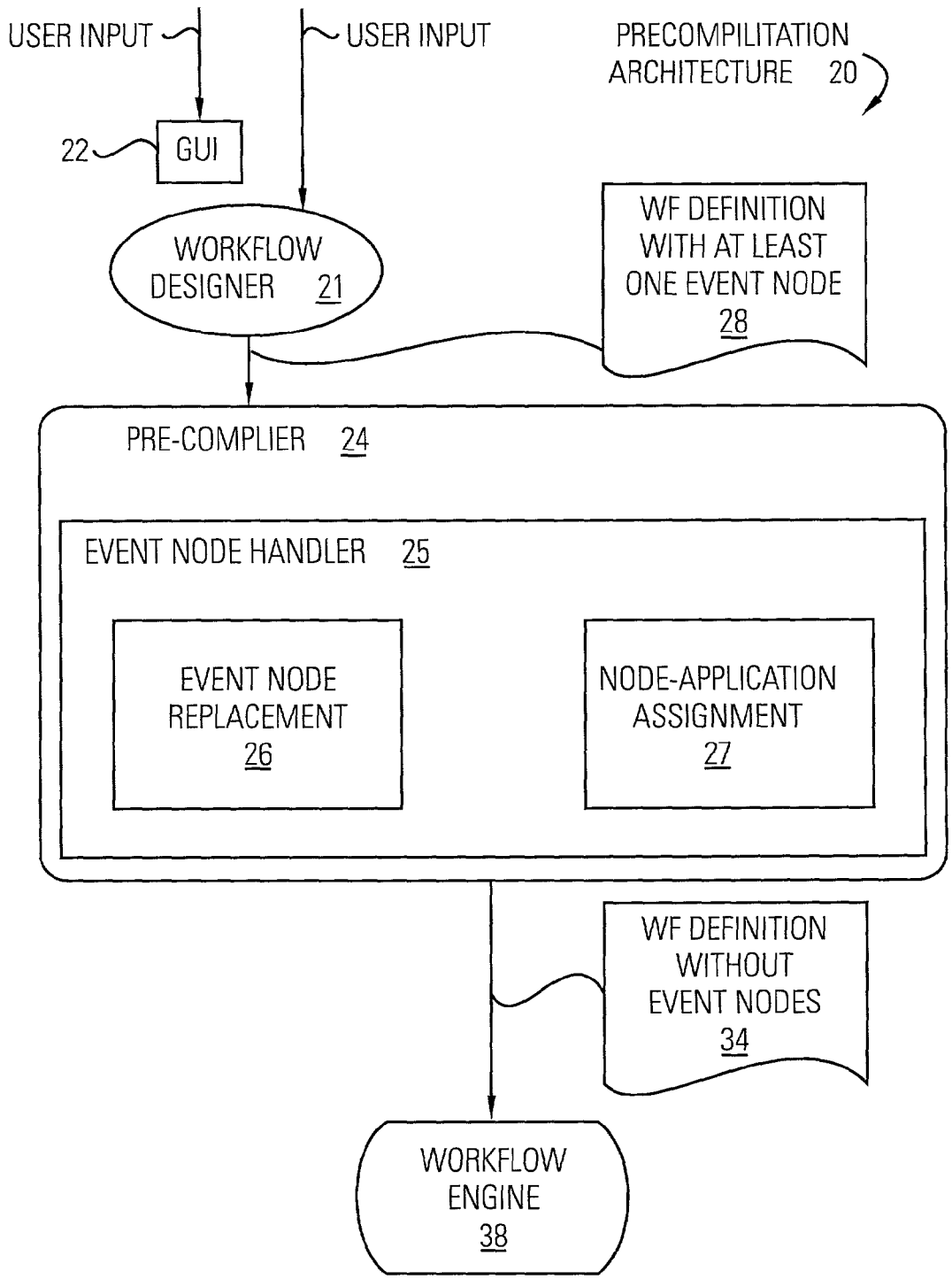
FIG. 1 illustrates a pre-compilation architecture for processing event nodes according to one embodiment of the present invention can be utilized.

A method and system for event-based scheduling of workflow activities are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The scheduling method and system of the present invention allows activities to be scheduled by a workflow management system (WFMS) not only based on the completion of previous activities in the same workflow, but also based on the occurrence of events (hereinafter referred to as event-based scheduling). The scheduling method and system of the present invention provides an automatic synchronization mechanism for enabling workflows to interact with other workflows or other applications to automatically synchronize activity execution. Furthermore, the scheduling method and system of the present invention provides an automatic data exchange mechanism for enabling workflows to exchange data with other workflows or other applications. The automatic synchronization mechanism and the automatic data exchange mechanism can be implemented by employing an event processing pre-compilation architecture, which is described in greater detail hereinafter with reference to FIGS. 1 & 2, and an event processing run-time architecture, which is described in greater detail hereinafter with reference to FIGS. 3–5.

Workflow Interaction

The present invention defines interactions among workflows by employing event nodes. Event nodes denote points in the workflow where an event is sent or received, thereby allowing automatic synchronization and data exchange with other processes, as well as, notification of state changes or requests of service execution.

Event nodes can be part of the flow structure of a workflow as ordinary tasks and can be of two types: send (produce) nodes or request (consume) nodes. Send nodes notify events to other processes and are non-blocking (i.e., they do not affect the execution of the workflow in which they are defined). For example, as the event is sent, the process execution proceeds immediately by activating the subsequent task.

Request nodes correspond instead to requests of events to be received from other processes. Request nodes are blocking (i.e., as a request node is reached in the control flow of a given workflow instance, the execution (along the path where the request node is defined) stops until an event with the specified characteristics is received.

The present invention allows for event nodes to be explicitly defined as part of the process model, thereby allowing the process designer to specify 1) what to notify, 2) when, and 3) what data to send along with the event notification, etc.

It is noted that the present invention does not place any restrictions on the event semantics, which are application specific. The characteristics of events and how event notifications and requests are modeled within workflow schemata are now described.

Pre-compilation Architecture 20

FIG. 1 illustrates a pre-compilation architecture 20 for processing event nodes according to one embodiment of the present invention. The pre-compilation architecture 20 includes a pre-compiler 24 that receives a workflow (WF) definition 28 that has at least one event node and based thereon generates a WF definition 34 without event nodes.

The workflow (WF) definition 28 can be generated by a user by employing a workflow design tool, such as workflow designer 21. The workflow designer 21 typically provides a graphical user interface (GUI) 22 to simplify user input. As described in greater detail hereinafter, the user can define event nodes that can be request nodes and send nodes. Moreover, an exemplary GUI for request nodes and send nodes is described with reference to FIG. 6.

The pre-compilation architecture 20 also includes a workflow engine 38 that is coupled to the pre-compiler 24 for receiving the WF definition 34 without event nodes. In the WF definition 34, in place of the event nodes are translated workflow nodes that are each assigned to a corresponding application that can implement the desired event node semantics and that is in accordance with the syntax supported by the underlying WfMS.

Figure 3:
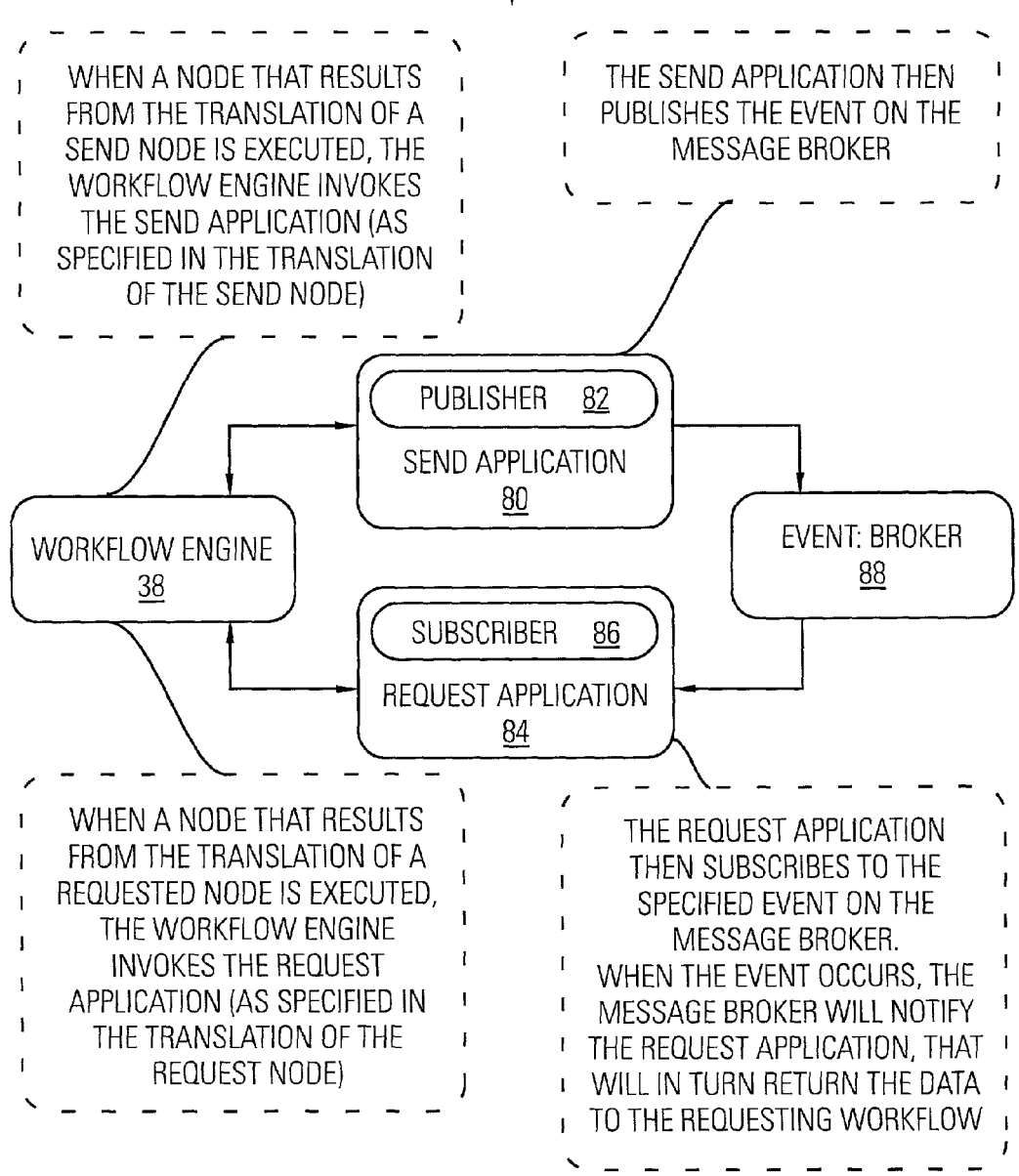
FIG. 3 illustrates a run-time architecture for processing event nodes according to one embodiment of the present invention can be utilized.

One advantage of the present approach is that event node handling mechanism of the present invention can be efficiently implemented on top of a generic WFMS through the use of the pre-compilation architecture of FIG. 1 and the run-time architecture of FIG. 3. The prior art approaches to events are specific to a particular WFMS and do not teach how the system of events can be implemented with a generic WFMS.

The pre-compiler 24 includes an event node handler 25 for replacing all event nodes in workflow definition 28 with translated nodes, having a syntax that is acceptable to an underlying workflow engine, so that the resulting workflow definition 34 can be implemented on top of an existing workflow engine 38. The event node handler 25 includes an event node replacement unit 26 for performing the replacement of event nodes with translated nodes.

The event node handler 25 also has a node application assignment unit 27 for assigning each translated node to a corresponding application that implements the event node semantics. As described in greater detail hereinafter, send nodes are replaced by nodes assigned to a send application, while request nodes are replaced with ordinary nodes, assigned for execution to a request application.

Processing by Pre-compiler 24

Figure 2:
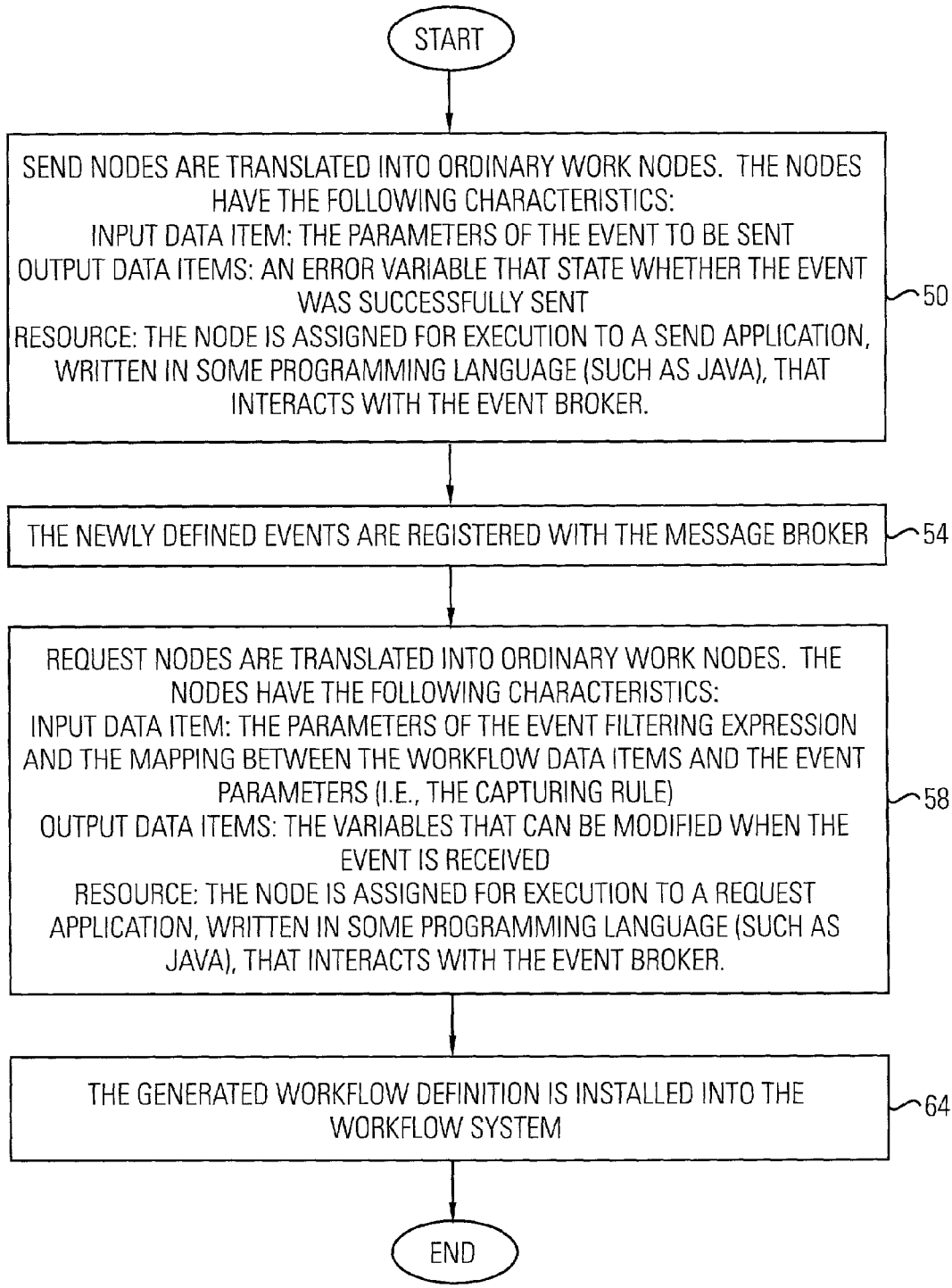
FIG. 2 is a flow chart illustrating the event node processing steps performed by the pre-compiler of FIG. 1 in accordance with one embodiment of the present invention.

FIG. 2 is a flow chart illustrating the processing steps performed by the pre-compiler 24 of FIG. 1 in accordance with one embodiment of the present invention. The pre-compiler 24 processes the workflow definition 28 and replaces send nodes and request nodes with ordinary workflow nodes to generate a modified workflow definition 34 that does not have event nodes. The resulting workflow definition 34 is then installed into a selected workflow engine. The processing steps illustrated in FIG. 2 can, for example, occur when a workflow definition is compiled.

In step 50, send nodes are translated into ordinary workflow nodes. The pre-compiler 24 defines the input data items, output data items, and resource assignment criteria of the ordinary nodes that are generated by the translation of the send node in the following manner. The input data items are the variables mentioned in the send expression defined in the event node. In addition, the send expression itself is an input parameter of the translated node. There is only one output data item, corresponding to an error variable that states whether the event was successfully sent or not. Finally, the resource assignment criteria of the node is specified so that the node is assigned to the send application.

The send application interacts with an event broker, which is described in greater detail hereinafter with reference to FIG. 3. The send application can be written in a programming language, such as Java.

In step 54, the newly defined events are registered with the event broker. In step 58, request nodes are translated into ordinary workflow nodes. The pre-compiler 24 defines the input data items, output data items, and resource assignment criteria of the ordinary nodes that are generated by the translation of the request node in the following manner. The input data items can be parameters of an event filtering expression and the mapping between the workflow data items and the event parameters, which is referred to herein as capturing rule. The output data items can specify those variables that can be modified when the event is received. The resource specifies a request application to which the node is assigned for execution. The request application can be written in a programming language, such as Java. In step 64, the generated workflow definition is installed into a workflow system.

Run-time Architecture 74

FIG. 3 illustrates a run-time architecture 74 for processing event nodes according to one embodiment of the present invention can be utilized. The run-time architecture 74 includes the workflow engine 38, a send application 80, a request application 84, and a publish/subscribe tool 88 for use by workflows to notify events to all interested parties (e.g., partners) and to receive events from them. The publish/subscribe tool 88, which can be, for example, a message broker or an event broker. The construction and operation of the message brokers, event brokers, and other similar publish/subscribe tools are well-known to those of ordinary skill in the art. The send and receive applications 80, 84, which can be invoked by any WfMS, enables the communication between the WfMS and the publish/subscribe tool 88.

When a node that results from the translation of a request node is executed, the workflow engine 38 invokes the request application 84 as specified in the translation of the request node. The request application 84 has a subscriber unit 86 that communicates with the event broker 88 to subscribe the request application 84 to the specified event on the event broker 88. When an event that meets the characteristics specified by the filtering expression occurs, the event broker 88 notifies the event to the request application 84, along with the data included in the event parameters. The operation of the request application 84 is described in greater detail hereinafter with reference to FIG. 4.

When a node that results from the translation of a send node is executed, the workflow engine 38 invokes the send application 80 as specified in the translation of the send node. The send application 80 has a publisher unit 82 that communicates with the event broker 88 to have the event broker 88 publish the event. The operation of the send application 80 is described in greater detail hereinafter with reference to FIG. 5.

Request Application Processing

Figure 4:
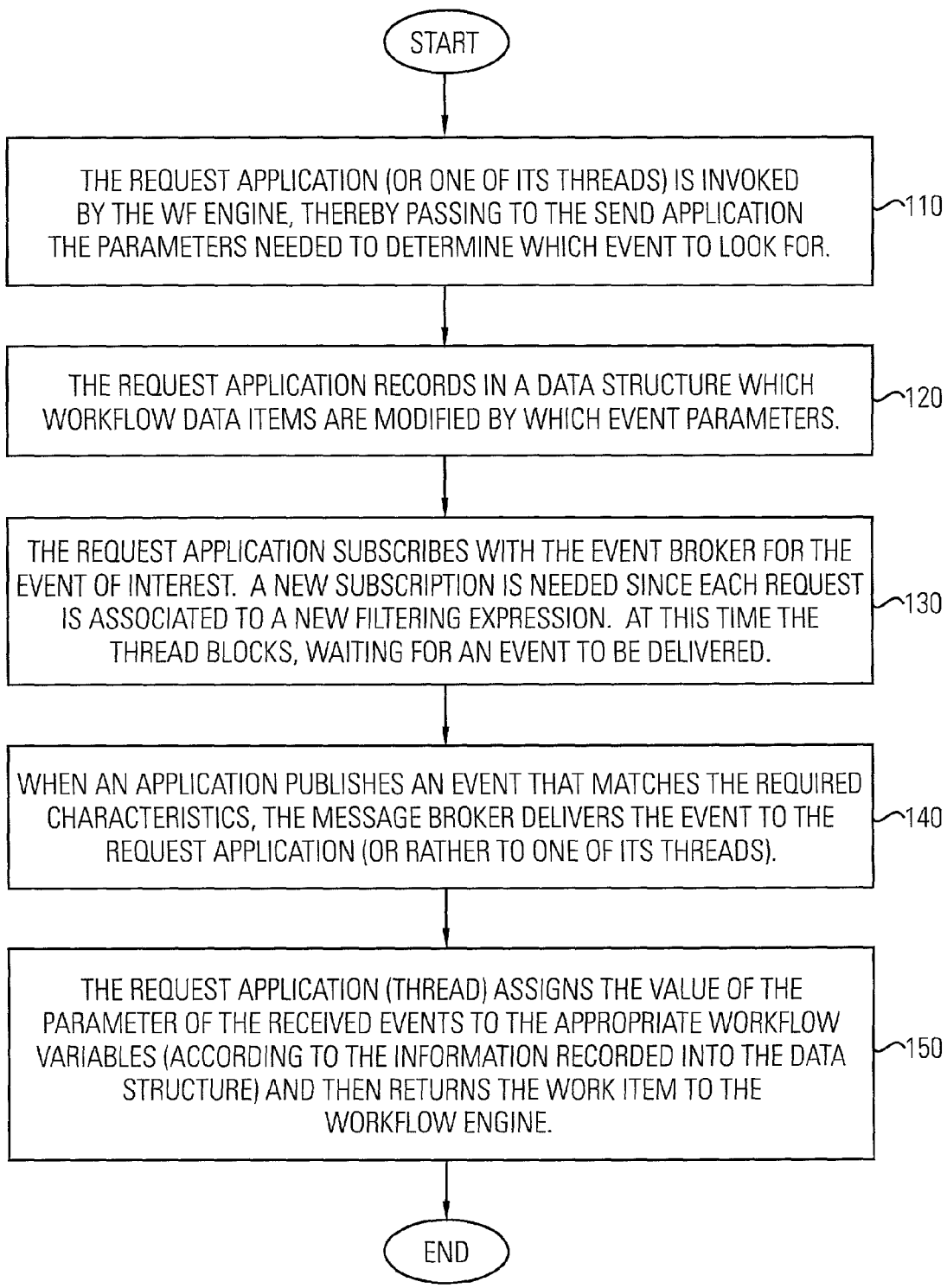
FIG. 4 is a flow chart illustrating the processing steps performed by the request application of FIG. 3 in accordance with one embodiment of the present invention.

FIG. 4 is a flow chart illustrating the processing step performed by the request application 84 of FIG. 3 in accordance with one embodiment of the present invention. In step 110, the request application 84 (or one of its threads) is invoked by the WF engine 38, thereby passing to the request application 84 one or more parameters that specify the characteristics of the event that the application wants to receive.

In step 120, the request application 84 records in a data structure the workflow data items that are to be modified by the parameters of the received event. It is noted that this step is optional in that certain request nodes may not require the return of data items (i.e., an event node may only require a notification of an occurrence of an event without needing to extract specific data from the returned event).

In step 130, the request application 84 subscribes with an event broker (e.g., event broker 88) for the event of interest. A new subscription is needed since each request is associated to a new filtering expression. At this time, the thread blocks and waits for the event of interest to be delivered.

In step 140, when an application, which may either be a workflow application or a non-workflow application, publishes an event that matches required parameters, the event broker delivers the event to the request application 84 (or one of its threads).

In step 150, the request application 84 (or one of its threads) assigns the value of the parameter of the received event to an appropriate workflow variable (herein referred to also as a data item) according to the information recorded into the data structure. The request application 84 then returns the workflow data item to the workflow engine. The workflow then continues operation.

By employing a publication and subscription model and a filtering mechanism, which is described in greater detail hereinafter, the present invention provides a mechanism for automatically delivering an event to all interested process instances without requiring manually written applications to track a specific process instance that is to be the recipient of the event.

Send Application Processing

Figure 5:
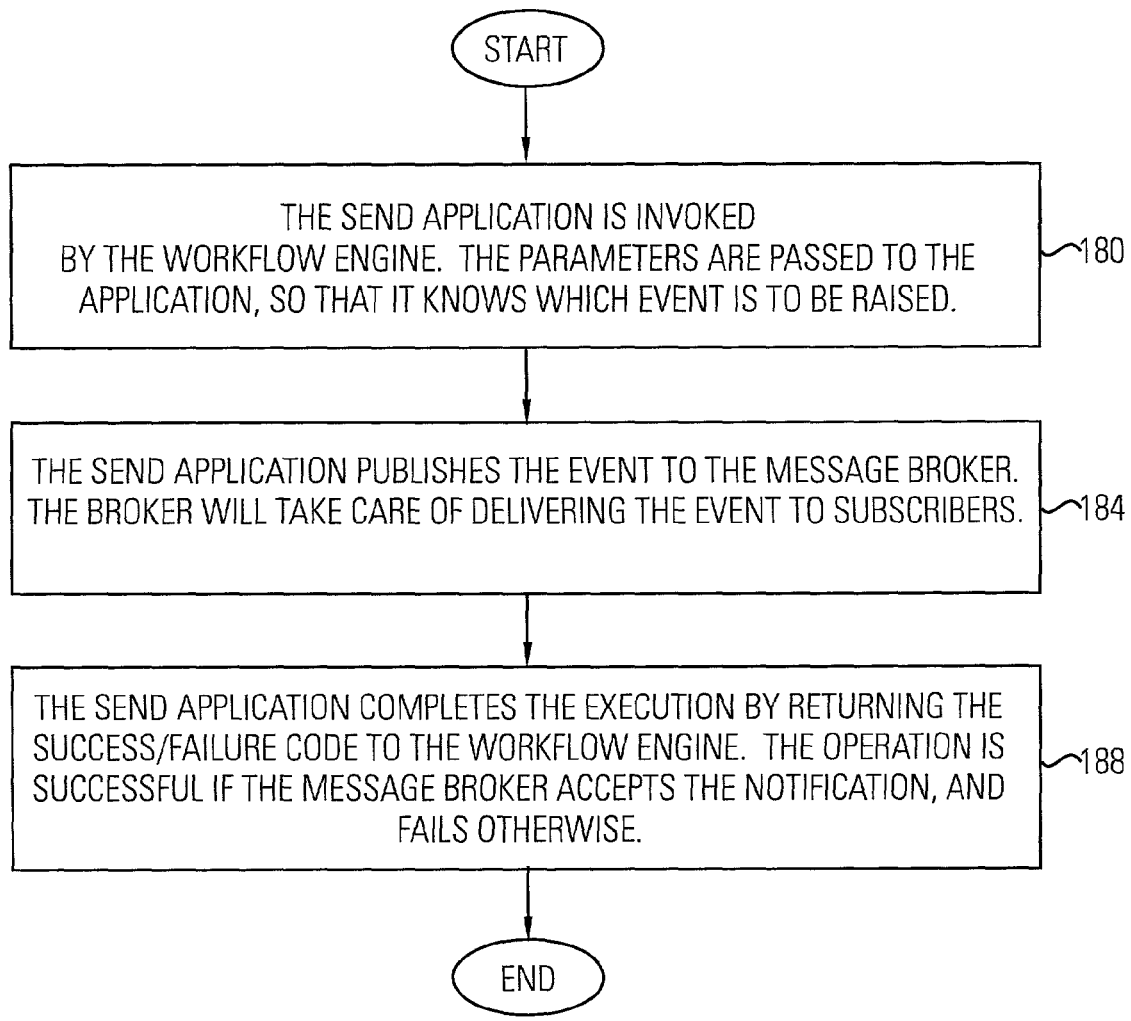
FIG. 5 is a flow chart illustrating the processing steps performed by the send application of FIG. 3 in accordance with one embodiment of the present invention.

FIG. 5 is a flow chart illustrating the processing step performed by the send application 80 of FIG. 3 in accordance with one embodiment of the present invention. In step 180, the send application 80 is invoked by the workflow engine (e.g., workflow engine 38). During this step, parameters are passed to the send application 80 to specify the name and parameters of the event to be sent. In step 184, the send application 80 publishes the event to an event broker (e.g., event broker 88). As described previously, the event broker handles the delivery of events to subscribers. In step 188, the send application 80 complete execution by returning a success or failure code to the workflow engine. The operation is successful when the event broker accepts the notification. Otherwise, the operation is a failure.

By employing a publication and subscription model, the present invention provides a mechanism for automatically delivering an event to all interested process instances without specifying a specific instance of a process (e.g., another workflow) as an intended recipient of the event.

Patient and Pacemaker Management System

Figure 6:
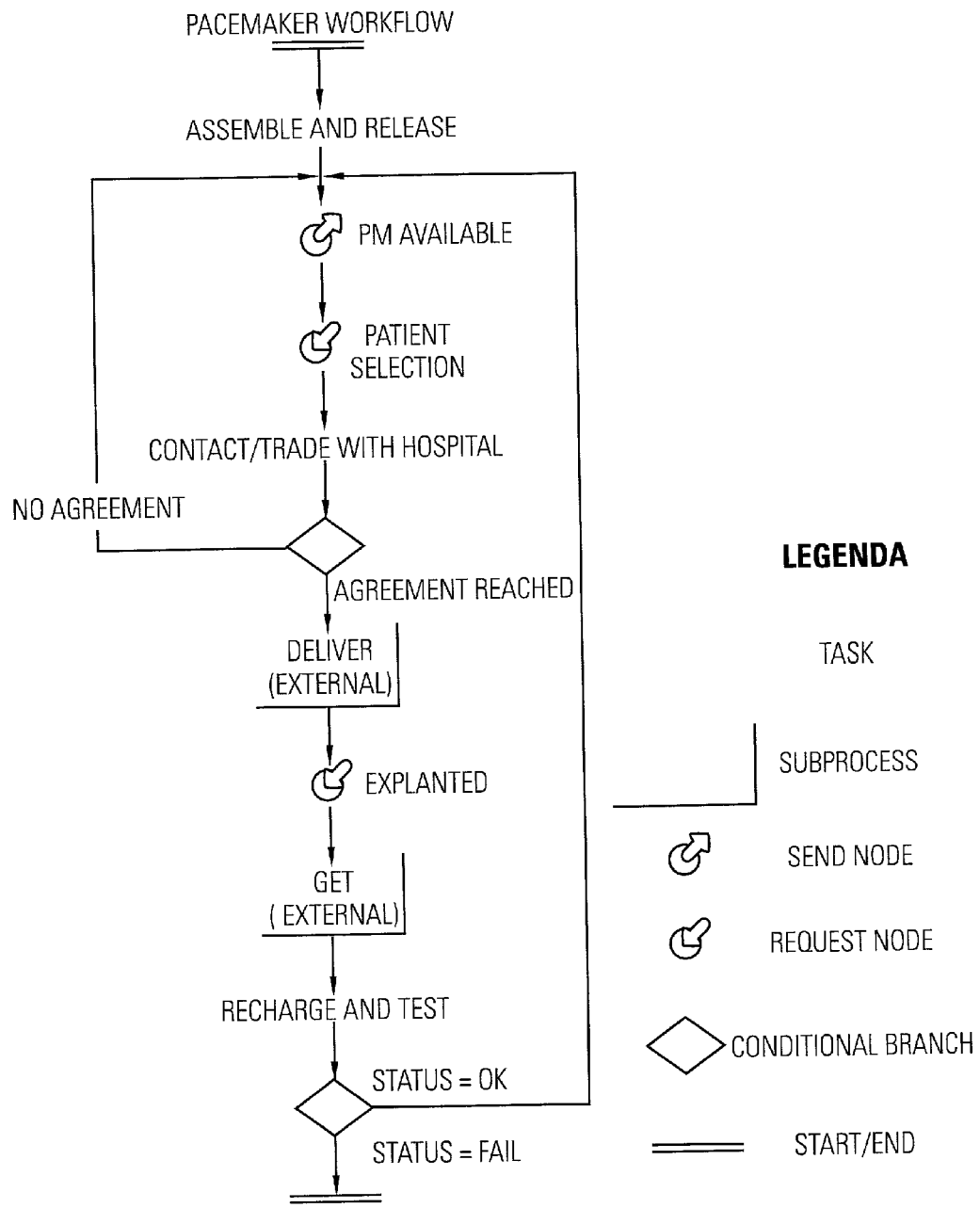
FIG. 6 is a flow chart illustrating a pacemaker workflow that utilizes request and send nodes in accordance with one embodiment of the present invention.
Figure 7:
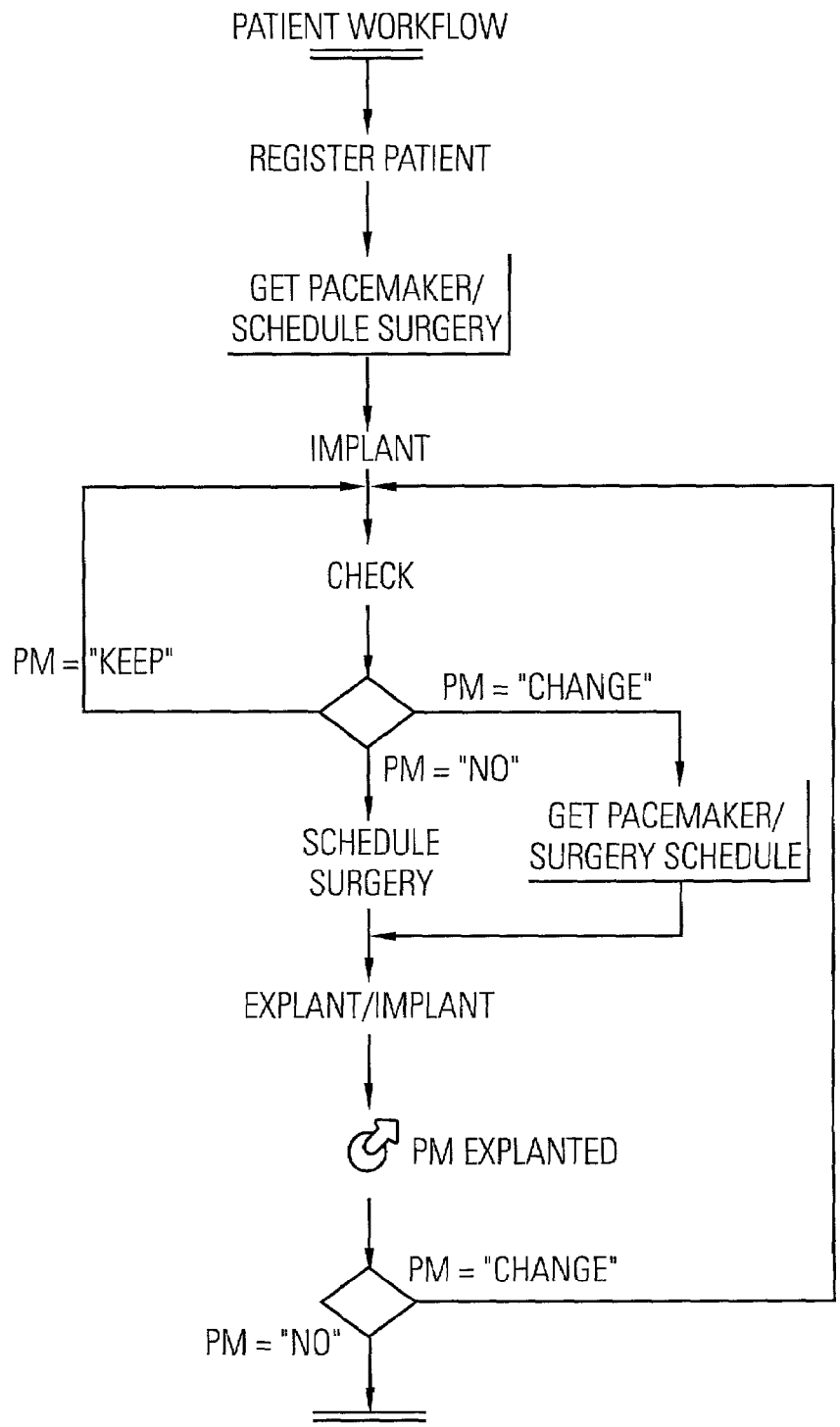
FIG. 7 is a flow chart illustrating a patient workflow that utilizes request and send nodes in accordance with one embodiment of the present invention.

An exemplary patient and pacemaker management system is now described. The two processes (i.e., the patient process and the pacemaker) require tight interoperability. However, the two processes are managed and executed within different organizations. FIG. 6 and FIG. 7 illustrate workflow schemas for the pacemaker process and the patient process, respectively. These processes are defined by activity graphs that employ event nodes (e.g., send nodes and request nodes). The semantics of the event nodes are described in greater detail hereinafter.

Pacemaker Workflow

FIG. 6 is a flow chart illustrating a pacemaker workflow that utilizes request and send nodes in accordance with one embodiment of the present invention. The pacemaker lifecycle begins with the manufacture of a new pacemaker. As the pacemaker is being manufactured, a notification is sent to a third-party health organization that supports patients and hospitals in finding pacemakers that meet certain predetermined qualifications and specifications. The pacemaker company waits for notification from the health care organization that informs the pacemaker company of the identity of the patient and hospital that has selected the pacemaker.

After receiving the notification, the pacemaker company contacts the hospital's physician to agree on technical, economical, and logistic issues. If no agreement is reached or if the physician decides that the pacemaker is not suitable, then the pacemaker re-issues the notification of the pacemaker availability. Otherwise, the pacemaker is delivered to the selected hospital. For the sake of brevity, the shipment process is not described herein.

After the delivery, the pacemaker is managed by the hospital, and the pacemaker process is required to take no further action, until the hospital notifies that the pacemaker has been explanted and that the packmaker is to be returned. After the hospital notifies that the pacemaker has been explanted, the pacemaker company arranges to obtain the pacemaker at the hospital site (e.g., through a shipping company). The pacemaker company then repairs and tests the pacemaker and notifies others that the pacemaker is now available. If instead the pacemaker cannot be repaired, the pacemaker is discarded, and the process terminates.

Patient Workflow

FIG. 7 is a flow chart illustrating a patient workflow that utilizes request and send nodes in accordance with one embodiment of the present invention. The patient workflow starts with the registration of the patient that needs a pacemaker. Next, a suitable pacemaker is selected through the health care organization. For example, the pacemaker company may be contacted to discover details about the selected pacemaker and also to reach an agreement on times, terms, and conditions with the pacemaker organization. Then, a surgery is scheduled, and a task that manages pacemaker reception and registration is activated. When the pacemaker has been delivered and the surgery has been scheduled, the pacemaker is implanted. Next, the patient undergoes follow up visits, until either the pacemaker is not working properly or it is not needed any more.

In the first case, the patient process selects and obtains a new pacemaker, and schedules the surgery to explant the old pacemaker and to implant the new one. If no pacemaker is needed, after the old one has been explanted, the process terminates. Note that with prior art workflow models, it is very difficult to describe such interactions, even between processes executed with the same WfMS. In fact, in commercial WfMSs, workflows are typically executed in isolation with respect to other workflows.

Interaction Model

In order to enable workflow interoperability, the present invention provides a mechanism for extending traditional WfMS models with the capability of exchanging events with other workflows or even to generic, non-workflow agents. These workflows or non-workflow agents may be executed in the same organization or in different organizations.

Event Classes

In the event-based model, every event belongs to an event class. An event class groups events that share common semantics, and is characterized by a class name, unique within an event service, and by an arbitrary number of parameters with their respective name and type. Parameters can, for example, be of type integer, string, real, Boolean, date, time, record, or payload, where the payload is a generic stream of bytes. Some parameters are user-defined and application specific, while others are application-independent. Some application-independent parameters must be defined for each event, while others are optional but, when defined, they have specific semantics, known to the event service.

Mandatory parameters are className (a string, set by the sender process, that identifies the class to which the event belongs), identifier (an integer, automatically assigned by the event service, that identifies each single event instance), and timestamp (the date and time of the event notification, also automatically assigned by the event service).

Optional parameters are sourceOrganization (the organization that produced the event), sourceCase (the process instance that produced the event), destOrganization (the organization to which the event is intended), and destCase (the process instance to which the event is intended). For instance, in order to enable cooperation among patient and pacemaker workflows, an event class pmExplant has been defined, with the following parameters (mandatory parameters identifier and timestamp are implicit, and their values are not defined by the process designer but rather assigned by the event service):

define event class pmExplant {
sourceOrganization: string
destOrganization: string
serialNumber: integer
explantDate: datetime }
Send Nodes Send nodes denote points in the flow where events are produced. Send nodes may be characterized by a name, unique within a workflow schema, and by a set of parameters that define the event to be produced. Event parameters are specified, for example, by pairs (parameter_name, value). Values may be constants or may refer to the name of a workflow variable, in which case the actual parameter is set at the value of the workflow variable at the time the event is sent. As an example, consider the send node pmExplanted in the patient workflow. The send node has the purpose of notifying the explant to the organization managing the explanted pacemaker. The send node generates an event of class pmExplant, and specifies three parameters in addition to the class name): 1) the target organization to which the event is intended, 2) the serial number of the pacemaker, and 3) the date of explant. The syntax used for the definition of the events can be as follows:

((className, "pmExplant")
(destOrganization, pmSenderOrg)
(serialNumber, pmSerialNumber)
(explantDate, pmExplantDate)).

The class name is defined by a constant, written between quotes, while the other parameters are specified (in this example) by references to local variables of the workflow instance in which the send node is executed. As the send node pmExplanted is reached, the sender workflow generates one event instance with the above parameters, and references to workflow variables are replaced by their respective value, computed at the time the event is raised. Event producers do not have to specify all the parameters when they notify an event instance of a given class. The only parameter they have to specify is the class name. However, if parameters are specified, preferably the parameters are a subset of the parameters defined for that class.

Request Nodes

Request nodes denote points in a process where the execution is suspended, waiting for an event to be delivered. Each event request receives at most one event instance, and only events that occur after the request has been issued can be delivered to the node. As the instance is delivered, process execution proceeds with the activation of the task connected in output to the request node. For each request node, the workflow designer specifies a name unique in the workflow schema and a request expression, that defines the kind of events the request nodes is interested in (e.g., specified by a filtering rule) and the event parameters whose value need to be captured within workflow variables (specified by a capturing rule).

In most cases, the filtering rule is needed to determine a particular event of interest. However, it is noted that the capturing rule is optional and need be specified only if the requesting workflow needs to capture the value of event parameters into local workflow variables.

Filtering Rule

The filtering rule defines the characteristics of the (composite) event in which the request node is interested. Filtering rules define a constraint over event instances in terms of names and values of event parameters. In addition, it is possible to define constraints over multiple event instances by requesting composite events, defined as sequences, disjunction, conjunction, or negation of event instances. The event service delivers to the requesting node the first (possibly composite) event instance matching the filtering rule and produced after the request has been issued. If an event instance matches the filtering rule of several requests, it is delivered to all of them.

Consider an example where the pacemaker process managed by the MediPace company. After the pacemaker has been delivered to the hospital, MediPace (and the pacemaker process) has no control over the pacemaker, until the hospital notifies that the pacemaker has been explanted. At that time, the pacemaker company takes care of organizing the shipment back to the pacemaker company. Thus, after delivering the pacemaker to the patient, the pacemaker management process has to stop and wait for the notification coming from the hospital.

In order to specify this behavior, the pacemaker schema includes a request node explanted, which captures all events of class pmExplant related to the pacemaker at hand, qualified by the organization name and by the pacemaker serial number. The following semantics can be specified by associating the following filtering rule to the request node explanted:

((className,"pmExplant")
(destOrganization,"MediPace")
(serialNumber, pmId)).

In the expression above, the event class (pmExplant) and the name of the pacemaker company (MediPace) are constants, and are independent from the specific process instance. The rule then specifies that the event parameter serialNumber must be equal to the value of the workflow variable pmId. It is noted that the rule is true for only one workflow instance. No requirement is set on the explant date (i.e., the node is interested in the event regardless of the explant date). At the time the request node is reached by the control flow, the pacemaker process issues a request to the event service, where references to names of workflow variables (e.g., pmId) are replaced by the values of such variables. Issued requests are not affected by subsequent changes in the values of these variables.

Attribute terms (i.e., the right hand side of the pairs in the filtering rule) can be constants, workflow variables, or event variables. Workflow variables (denoted by strings starting with a lowercase letter, such as pmId, allows the specification of filters that depend on the state of the requesting workflow instance, and are replaced by the value of the variable at the time the request is issued. Event variables that are denoted by strings starting with an uppercase letter allow the designer to specify filtering rules that include correlation constraints as described herein below.

Capturing Rule

Besides defining the event of interest by means of a filter over event parameters, a request node may also capture the value of event parameters into local workflow variables. For this purpose, the filtering rule is coupled with a capturing rule. For instance, assume that the pacemaker process is also interested, upon notifications of explants, in capturing the explant date, needed for tracking purposes. Therefore, the request node explanted also needs to capture the value of parameter explantDate of event pmExplant into the local variable wfExplantDate. The capturing rule that defines this behavior is defined as follows:

((wfExplantDate, explantDate)).

Example of Event Nodes

Figure 9:
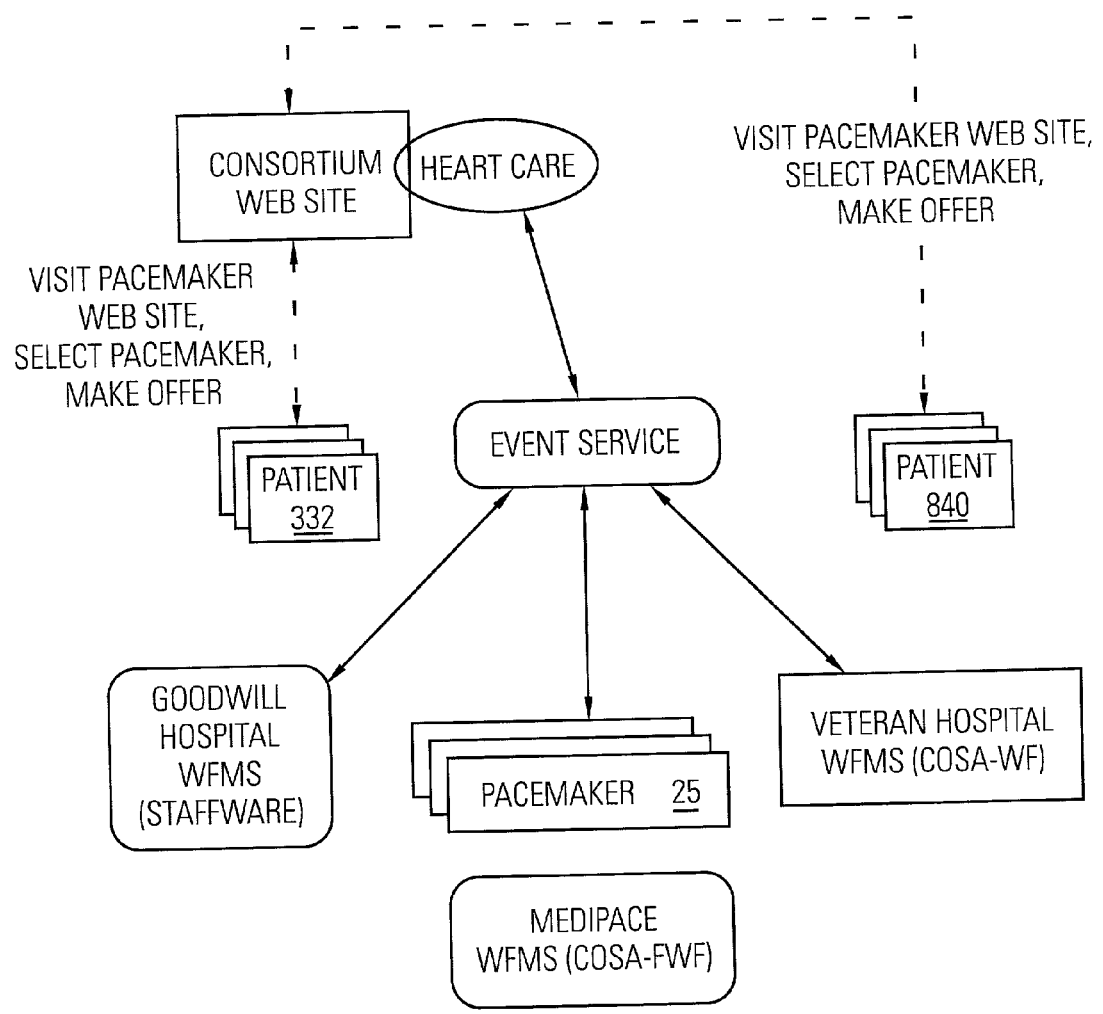
FIG. 9 shows the scenario in which the patient and pacemaker workflows operate and interact.

FIG. 9 shows the scenario in which the patient and pacemaker workflows operate and interact. For simplicity, we assume that there is just one health care organization, called HeartCare, that helps physicians and hospitals in finding a suitable pacemakers, and we also assume that there is a single event service (possibly managed by the same HeartCare organization) through which hospitals and pacemaker producer companies cooperate.

In the pacemaker workflow, as a new pacemaker is built (or after it has been repaired), an event is sent (send node pmAvailable of FIG. 6) to the HeartCare organization in order to notify the availability of the pacemaker. We assume that the HeartCare organization accepts and recognizes events of class newPm that inform about available pacemakers. Class newPm includes the following parameters: sourceOrganization and destOrganization of type string, serialNumber of type integer, and dataSheet of type payload.

Within send node pmAvailable of a pacemaker workflow run at the MediPace company, the event is formed in the following way:

((className, "newPm")
(destOrganization, "HeartCare")
(sourceOrganization, "MediPace")
(serialNumber, pmSerialNumber)
(dataSheet, pmDataSheet))

Information about the class name and the target organization is used by HeartCare in order to filter the events it is willing to receive (i.e., those of class newPm intended toHeartCare). Information about the sender organization, the pacemaker serial number, and the data sheet is needed in order to modify properly a web site that includes information available to physicians. It is noted that the event architecture of the present invention does not require business processes of the health care organization to be supported by workflow managers. Indeed, workflows can use events to interact with non-workflow applications. In this case, we only require the HeartCare company to "listen" to notifications of newPm events by issuing requests to the event service filtered as follows:

((className, "newPm")
(destOrganization, "HeartCare"))

After notifying the pacemaker availability, the pacemaker process waits for a message from HeartCare informing that a patient has selected the pacemaker. We assume that HeartCare produces events of class pmSelected in order to inform that a given pacemaker has been selected for a patient by a physician, also including event parameter physicianNameAndAddress, of type string, that the pacemaker process captures into the local workflow variable contactInfo. This behavior is specified by request node patientSelection, that has the following request expression:

((className, "pmSelected")
(destOrganization, "MediPace")
(serialNumber, pmId))
((contactInfo, physicianNameAndAddress))

Finally, the pacemaker workflow includes request node ex-planted, which captures all events of type pmExplant related to the pacemaker at hand, qualified by the pacemaker serial number. The following request expression is associated to the request node explanted:

((className, "pmExplant")
(destOrganization, "MediPace")
(serialNumber, pmId))
((wfExplantDate, explantDate))

pmExplant events are produced by the patient workflow illustrated in FIG. 7 to notify to the pacemaker organization that the-pacemaker has been explanted. The event expression of the send node is as follows:

((className, "pmExplant")
(destOrganization, pmSenderOrg)
(serialNumber, pmSerialNumber)
(explantDate, pmExplantDate))

Exemplary Computer System 200

Figure 8:
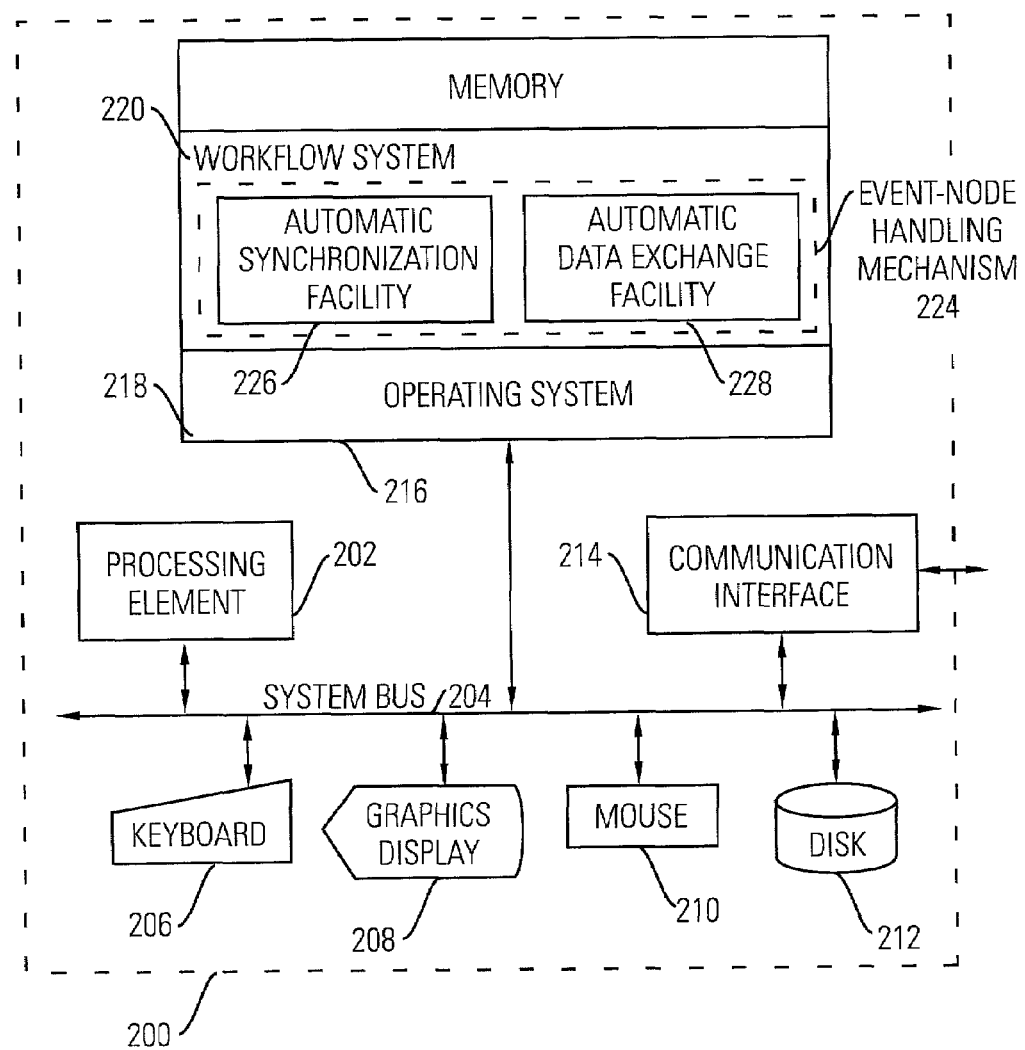
FIG. 8 is a block diagram of an exemplary computer system in which the event node handling mechanism of the present invention can be implemented.

FIG. 8 is a block diagram of an exemplary computer system 200 in which the event node handling mechanism of the present invention can be implemented. Referring now to FIG. 8, the computer system 200 contains a processing element 202 which communicates to other elements of the computer system 200 over a system bus 204. A keyboard 206 allows text input to the computer system 200 and a mouse 210 allows graphical locator input to the computer system 200. A graphics display 208 provides for graphics and text output to be viewed by a user of the computer system 200. A disk 212 stores an operating system and other data used by the computer system 200, for example, the event node handler, send applications, and receive applications, could reside on the disk 212. A memory 216 contains an operating system 218 and a workflow system 220.

In one embodiment, the workflow system 220 includes the event node handling mechanism 224 of the present invention for processing event nodes (e.g., request nodes and send nodes). The event node handling mechanism 224 includes an automatic synchronization facility 226 and an automatic data exchange facility 228. The automatic synchronization facility 226 provides a uniform and homogeneous mechanism for automatically synchronizing or coordinating between workflows or between a workflow and other applications. The automatic data exchange facility 228 provides a uniform and homogeneous mechanism for automatically exchanging information between workflows or between a workflow and other applications.

It is noted that the computer system 200 may communicate to other computer systems (not shown) through communications interface 214, to allow the other computer systems to perform tasks assigned to various processes of the workflow system. For example, the communications interface 214 may be a connection to a local area network (LAN). Thus, in the workflow system, all processes (e.g., workflows) may use a single computer, each process may use a separate computer connected through the communications interface 214, or the system may be a combination of multiple processes on some computers, with some processes having separate computers.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for event-based synchronization in a workflow having at least one event node comprising:
   executing a current workflow having a plurality of work nodes;
   encountering plural event nodes including an event node that specifies an event;
   suspending execution of the workflow and waiting for the occurrence of the event; and
   proceeding to a next work node only when the event occurs, wherein the event nodes includes a request node and a send node, the request node blocks execution of the workflow and specifies a point where execution is suspended until a specified event is delivered, and the send node specifies a point where events are produced,
   providing automatic cooperation between the current workflow and an external process by employing a publish and subscribe event notification, whereby a workflow designer does not need to specify a specific process instance involved in cooperation, enabling workflows to interact with other workflows or other applications to automatically synchronize activity execution, enabling workflows to interact with other workflows or other applications to automatically data exchange.

2. The method of claim 1 further comprising the step of:
   communicating data between the current workflow and another process.

3. The method of claim 1 further comprising the step of:
   receiving, by the request node, information regarding the current workflow to a receiver of the request.

4. The method of claim 1 further comprising the step of:
   sending, by the send node, information regarding a sender of the event.

5. The method of claim 1 wherein the event is one of an event triggered by a process, a workflow, an application, or a human trigger.

6. The method of claim 1 further wherein the workflow is one of a workflow in an enterprise that is common to the current workflow, a workflow in an enterprise that is different from the current workflow, an application in an enterprise that is common to the current workflow, an application in an enterprise that is different from the current workflow.

7. A computer system for processing workflow definitions having at least one event node with desired event node semantics comprising:
   a workflow engine for processing workflow definitions and for supporting a predetermined workflow syntax;
   an event node handler for receiving a workflow definition having at least one event node and responsive thereto for generating at compile time a workflow definition with translated event nodes;
   wherein the event node handler includes an event node replacement unit for replacing each event node with a translated workflow node that conforms to the predetermined workflow syntax supported by the workflow engine; and
   a node application assignment unit for assigning an application to each translated workflow node that can implement the desired event node semantics,
   wherein the system provides automatic cooperation between the current workflow and an external process by employing a publish and subscribe event notification, whereby a workflow designer does not need to specify a specific process instance involved in cooperation; wherein the system enables workflows to interact with other workflows or other applications to automatically synchronize activity execution;
   wherein the system enables workflows to interact with other workflows or other applications to automatically data exchange.

8. The system of claim 7 further comprising:
   a run-time architecture for invoking at run time at least one application assigned to a translated node.

9. The system of claim 8 wherein the application is one of a send application and a receive application.

10. The system of claim 7 wherein the event node is one of a send node and a receive node.

11. An workflow management computer system comprising:
    a first process;
    a second process for cooperating with the first process;
    an automatic cooperation facility to automatically synchronize execution of activities in the first process and the second process, for exchanging data between the first process and the second process, for notifying state changes of the first process and the second process, for notifying that milestones have been reached in process execution, and for requesting the activation of a remote process from the first process and the second process; and
    an event dispatcher having a publish-subscribe model that notifies events to interested parties and receives events of interest from other processes through the event dispatcher.

12. The system of claim 11 further comprising:
    at least one event node; wherein the event node specifies filtering rules of events of interest based on the values of event parameters.

13. A method for processing event nodes in a workflow definition comprising the steps of:
    a) during compile time, translating the workflow definition with event nodes into a revised workflow definition with translated workflow nodes; during run-time
    b) when a translated request node is encountered, invoking a request application;
    c) the request application subscribing with an event broker for an event of interest by specifying required parameters;
    d) when an application publishes an event that matches the required parameters of the event of interest, the event broker delivering the event to the request application;
    e) when a send node is encountered, invoking a send application; and
    f) the send application publishing an event with an event broker.

14. The method of claim 13 further comprising after step (d) the step of:
    returning a work item to a workflow that had a request node.

15. The method of claim 13 further comprising the step of:
g) the send application returning to a workflow that had the send node a success code when successful and a failure code when not successful.

16. A method for processing event nodes comprising:
an event broker for providing event publication and subscription services;
a send application for processing send nodes and for publishing at least one event with the event broker;
a request application for processing request nodes and for subscribing to at least one event on the event broker; and
a workflow engine for invoking the send application when processing a send node and for invoking the request application when processing a request node.

\* \* \* \* \*

UNITED STATES PATENT AND TRADEMARK OFFICE
CERTIFICATE OF CORRECTION

| | | |
|---|---|---|
| PATENT NO. | : 7,240,324 B2 | |
| APPLICATION NO. | : 09/797536 | |
| DATED | : July 3, 2007 | |
| INVENTOR(S) | : Fabio Casati et al. | |

It is certified that error appears in the above-identified patent and that said Letters Patent is hereby corrected as shown below:

On page 2, item (56), under "Other Publications" in column 1, lines 1-3, delete "Hans Schuster, Jens Neeb, Ralf Schaumburger, A configuration management approach for large workflow management systems, 1999,, ACM, p. 177-186.*"

In column 14, line 6, in Claim 7, after "semantics" delete "," and insert -- ; --, therefor.

In column 14, line 25, in Claim 11, delete "An" and insert -- A --, therefor.

Signed and Sealed this

Twenty-eighth Day of April, 2009

JOHN DOLL
*Acting Director of the United States Patent and Trademark Office*